United States Patent
Kim et al.

(10) Patent No.: US 11,508,363 B2
(45) Date of Patent: Nov. 22, 2022

(54) SPEECH PROCESSING APPARATUS AND METHOD USING A PLURALITY OF MICROPHONES

(71) Applicant: Samsung Electronics Co., Ltd., Suwon-si (KR)

(72) Inventors: Seongwoo Kim, Seongnam-si (KR); Dongil Hyun, Seongnam-si (KR); Jongwon Shin, Gwangju (KR); Sein Cheong, Gwangju (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 47 days.

(21) Appl. No.: 17/072,672

(22) Filed: Oct. 16, 2020

(65) Prior Publication Data

US 2021/0319788 A1    Oct. 14, 2021

(30) Foreign Application Priority Data

Apr. 9, 2020   (KR) .......................... 10-2020-0043602

(51) Int. Cl.
  *G10L 15/20*   (2006.01)
  *G10L 25/21*   (2013.01)

(52) U.S. Cl.
  CPC .............. *G10L 15/20* (2013.01); *G10L 25/21* (2013.01)

(58) Field of Classification Search
  CPC .............................. G10L 15/20; G10L 25/21
  USPC .......................................................... 704/226
  See application file for complete search history.

(56) References Cited

U.S. PATENT DOCUMENTS

| | | |
|---|---|---|
| 7,831,035 B2 | 11/2010 | Stokes et al. |
| 8,903,722 B2 | 12/2014 | Jeub et al. |
| 9,633,651 B2 | 4/2017 | Habets et al. |
| 9,653,092 B2 | 5/2017 | Sun et al. |
| 2007/0154031 A1* | 7/2007 | Avendano .............. H04R 1/406 381/91 |

(Continued)

FOREIGN PATENT DOCUMENTS

WO   WO-2012/158163 A1   11/2012

OTHER PUBLICATIONS

M. D″orbecker and S. Ernst, "Combination of two-channel spectral subtraction and adaptive wiener post-filtering for noise reduction and dereverberation," in Proc. of European Signal Processing Conf. (EUSIPCO), Trieste, Italy, 1996. (Year: 1996).*

(Continued)

*Primary Examiner* — Bharatkumar S Shah
(74) *Attorney, Agent, or Firm* — Harness, Dickey & Pierce, P.L.C.

(57) ABSTRACT

A speech processing apparatus includes a plurality of microphones configured to receive a plurality of input signals, and processing circuitry configured to generate a spatial filtering signal corresponding to the plurality of input signals through spatial filtering, generate estimated noise information by integrating directional noise information representing a level of a noise signal received from a direction of interest with diffuse noise information representing levels of noise signals received from various directions based on whether the plurality of input signals have directionality, and generate an estimated speech signal by filtering the spatial filtering signal based on the estimated noise information.

19 Claims, 11 Drawing Sheets

(56) References Cited

U.S. PATENT DOCUMENTS

| | | | |
|---|---|---|---|
| 2009/0012783 A1* | 1/2009 | Klein | G10L 21/0208 |
| | | | 704/226 |
| 2012/0250882 A1 | 10/2012 | Mohammad et al. | |
| 2013/0163748 A1 | 6/2013 | Khanduri et al. | |
| 2015/0189092 A1 | 7/2015 | Thapa et al. | |
| 2015/0310857 A1* | 10/2015 | Habets | G10L 15/14 |
| | | | 704/240 |
| 2016/0066087 A1 | 3/2016 | Solbach et al. | |
| 2019/0259381 A1* | 8/2019 | Ebenezer | H04R 3/005 |

OTHER PUBLICATIONS

S. V. Arora and R. Vig, "Comparison of Speech Intelligibility Parameter in Cochlear Implants by Spatial Filtering and Coherence Function Methods," 2016 International Conference on Micro-Electronics and Telecommunication Engineering (ICMETE), 2016, pp. 573-577, doi: 10.1109/ICMETE.2016.35. (Year: 2016).*

C. M. Nelke, C. Beaugeant and P. Vary, "Dual microphone noise PSD estimation for mobile phones in hands-free position exploiting the coherence and speech presence probability," 2013 IEEE International Conference on Acoustics, Speech and Signal Processing, 2013, pp. 7279-7283, doi: 10.1109/ICASSP.2013 (Year: 2013).*

M. Dorbecker and S. Ernst, "Combination of two-channel spectral subtraction and adaptive wiener post-filtering for noise reduction and dereverberation," in Proc. of European Signal Processing Conf. (EUSIPCO), Trieste, Italy, 1996. (Year: 1996 (Year: 1996).*

Gerkman, T. and R. C. Hendriks. "Unbiased MMSE-Based Noise Power Estimation With Low Complexity and Low Tracking Delay." *IEEE Transactions on Audio, Speech, and Language Processing*, vol. 20, No. 4 (May 2012): pp. 1383-1393.

Nelke, C.M. et al. "Dual Microphone Noise PSD Estimation for Mobile Phones in Hands-Free Position Exploiting the Coherence and Speech Presence Probability." 2013 IEEE International Conference on Acoustics, Speech and Signal Processing (2013): pp. 7279-7283.

* cited by examiner

SPEECH PROCESSING APPARATUS AND METHOD USING A PLURALITY OF MICROPHONES

CROSS-REFERENCE TO RELATED APPLICATION

This application claims the benefit of Korean Patent Application No. 10-2020-0043602, filed on Apr. 9, 2020, in the Korean Intellectual Property Office, the disclosure of which is incorporated herein in its entirety by reference.

BACKGROUND

The inventive concepts relate to an apparatus and a method for estimating a noise signal and a speech signal in an input signal input to a plurality of microphones.

A technology of estimating the noise signal in order to obtain the speech signal from the input signal input to a microphone is essential to improving speech quality in a bidirectional speech communication system.

The estimated noise signal may be used for various systems such as an acoustic environment identification system, a speech recognition system, and a speaker identification system as well as a bidirectional communication system.

Because the noise signal input to the microphone has both a stationary characteristic and a non-stationary characteristic, it is difficult to perfectly estimate the noise signal. For example, the noise signal with the stationary characteristic may be white noise. The noise signal with the non-stationary characteristic may be vehicle interior noise or cafe noise.

In most noise removing technologies, the noise signal is removed by using a gain function calculated in a frequency range. Because the gain function is dependent on an estimate of the noise signal, it is very important to correctly estimate the noise signal.

SUMMARY

The inventive concepts relate to estimation of a noise signal and a speech signal in a plurality of input signals.

According to some example embodiments of the inventive concepts, there is provided a speech processing apparatus including a plurality of microphones configured to receive a plurality of input signals, and processing circuitry configured to generate a spatial filtering signal corresponding to the plurality of input signals through spatial filtering, generate estimated noise information by integrating directional noise information representing a level of a noise signal received from a direction of interest with diffuse noise information representing levels of noise signals received from various directions based on whether the plurality of input signals have directionality, and generate an estimated speech signal by filtering the spatial filtering signal based on the estimated noise information.

According to some example embodiments of the inventive concepts, there is provided a method of estimating a noise signal in a plurality of input signals, including generating directional noise information based on a spatial filtering signal generated by performing spatial filtering on the plurality of input signals and presence probability (PP) of a speech signal included in the plurality of input signals, generating diffuse noise information based on coherence information among the plurality of input signals, and estimating the noise signal by linearly combining the directional noise information with the diffuse noise information by using the coherence information as a weight.

According to some example embodiments of the inventive concepts, there is provided an electronic device including an input device configured to receive a plurality of input signals including a speech signal and a noise signal and processing circuitry electrically connected to the input device and configured to estimate the speech signal from the plurality of input signals, generate a spatial filtering signal through spatial filtering for the plurality of input signals, generate directional noise information based on presence probability (PP) of the speech signal included in the plurality of input signals and the spatial filtering signal, generate diffuse noise information based on coherence information among the plurality of input signals, and estimate the noise signal included in the plurality of input signals by linearly combining the directional noise information with the diffuse noise information.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, some example embodiments of the inventive concepts will be described in detail with reference to the accompanying drawings.

Figure 1:
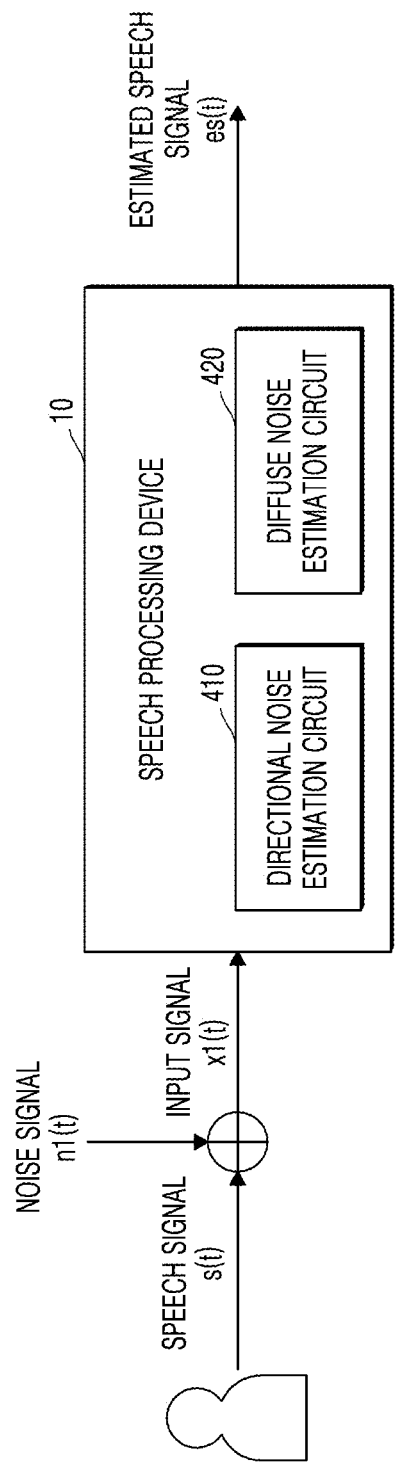
FIG. 1 is a view illustrating a speech processing device according to some example embodiments of the inventive concepts.

FIG. 1 is a view illustrating a speech processing device 10 according to some example embodiments of the inventive concepts.

Referring to FIG. 1, an input signal x(t) input to the speech processing device 10 may include a speech signal s(t) generated by a speaker and a noise signal n(t). The input signal x(t) may be represented by [EQUATION 1].

$$x(t)=s(t)+n(t) \quad \text{[EQUATION 1]}$$

The noise signal n(t) may include a noise signal with a stationary characteristic and a noise signal with a non-stationary characteristic. The noise signal with the stationary characteristic may be a noise signal with a statistical characteristic that is uniform over time. For example, the noise signal with the stationary characteristic may be white noise. The noise signal with the non-stationary characteristic may be a noise signal with a statistical characteristic fluctuating over time. For example, the noise signal with the non-stationary characteristic may be vehicle interior noise or cafe noise. The input signal x(t) may be represented by [EQUATION 1].

The speech processing device 10 may include a directional noise estimation circuit 410 and a diffuse noise estimation circuit 420.

The directional noise estimation circuit 410 may generate directional noise information. The directional noise information may represent a level of a noise signal received in a direction of interest. For example, the directional noise information may represent dispersion of a directional noise signal. The directional noise information may represent the noise signal received from the direction of interest more correctly than noise signals received from the other directions. Therefore, the directional noise information may be used for estimating the directional noise signal. The directional noise estimation circuit 410 may generate the directional noise information by amplifying an input signal received in the direction of interest and suppressing input signals received in the other directions. In addition, the directional noise estimation circuit 410 may estimate noise based on speech presence probability.

In a speech presence probability (SPP)-based noise estimating method, although a noise signal may be stably estimated, the noise signal may not be correctly estimated and the strength of the noise signal is estimated to be low in a non-stationary noise environment. The SPP-based noise estimating method may be suitable for estimating the noise signal received in the direction of interest. That is, the SPP-based noise estimating method may be suitable for estimating the directional noise signal. When noise is removed by using the SPP-based noise estimating method, residual noise may remain.

The diffuse noise estimation circuit 420 may generate diffuse noise information. The diffuse noise information may represent levels of noise signals with a uniform weight for various directions. The diffuse noise information may represent dispersion of a diffuse noise signal. Therefore, the diffuse noise information may be suitable for representing a non-directional noise signal. The diffuse noise estimation circuit 420 may generate the diffuse noise information by using coherence of the input signal.

In a coherence-based noise estimating method, although a non-stationary noise signal may be rapidly estimated, the strength of the noise signal is estimated to be high. The coherence-based noise estimating method may be suitable for estimating noise signals received in various directions. That is, the coherence-based noise estimating method may be suitable for estimating the non-directional noise signal. When noise is removed by using the coherence-based noise estimating method, a speech signal may be distorted.

The speech processing device 10 may generate noise estimation information by integrating the directional noise information with the diffuse noise information. That is, the noise estimation information may include the directional noise information and the diffuse noise information. The noise estimation information may represent the level of the noise signal included in the input signal. The speech processing device 10 may control a ratio of the directional noise information included in the noise estimation information and a ratio of the diffuse noise information included in the noise estimation information based on coherence of received input signals. The coherence of the input signals may represent directionality of the input signals.

The speech processing device 10 may receive the input signal x(t), may generate estimated noise information representing the level of the noise signal included in the input signal x(t), and may generate an estimated speech signal es(t) by filtering the input signal based on the estimated noise information.

Figure 2:
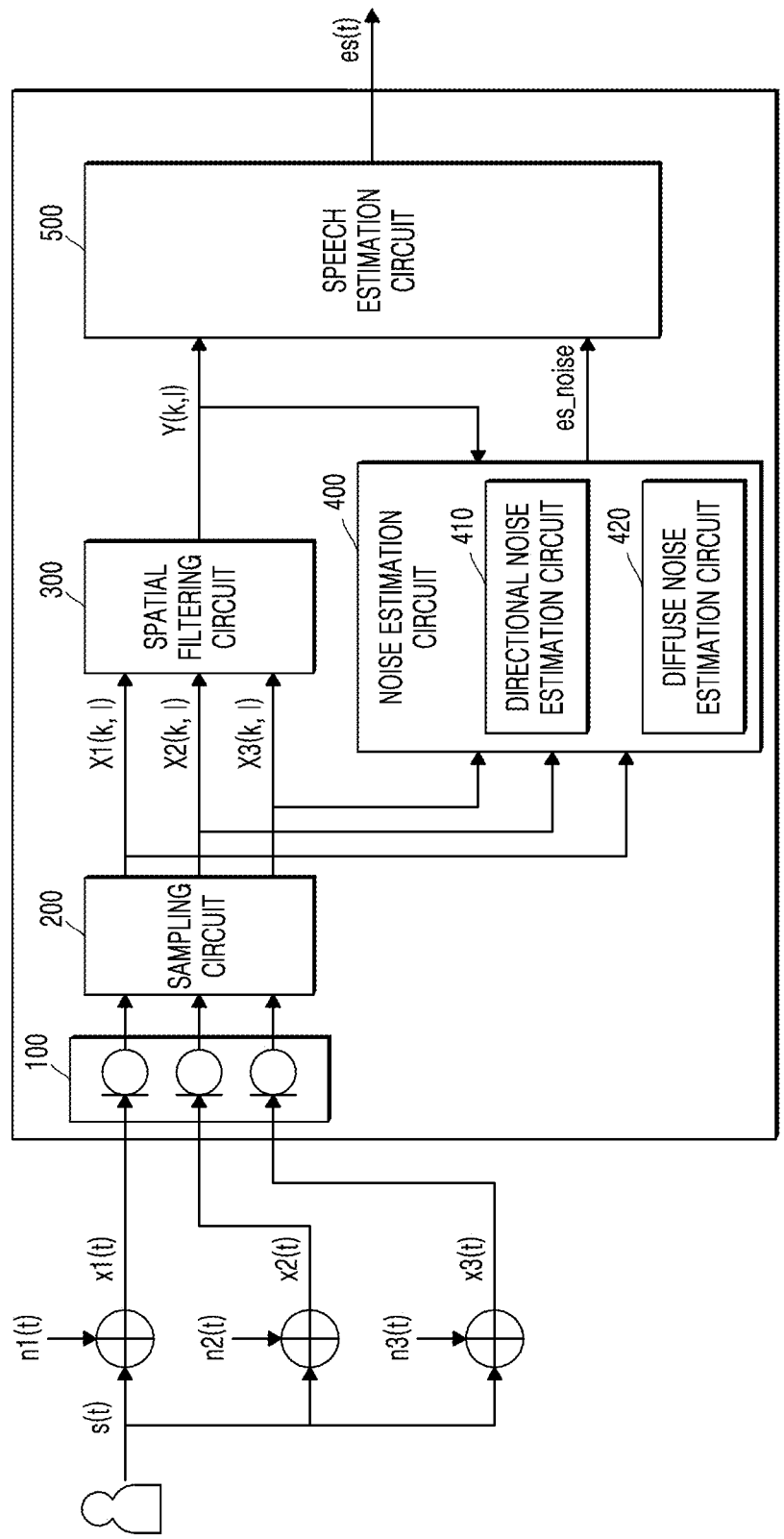
FIG. 2 is a block diagram specifically illustrating a speech processing device according to some example embodiments of the inventive concepts.

FIG. 2 is a block diagram specifically illustrating the speech processing device 10 according to some example embodiments of the inventive concepts.

Referring to FIG. 2, the speech processing device 10 may include a microphone array 100, a sampling circuit 200, a spatial filtering circuit 300, a noise estimation circuit 400, and/or a speech estimation circuit 500.

The microphone array 100 may include a plurality of microphones. The microphone array 100 may receive a plurality of input signals from the outside. For example, the microphone array 100 may receive a first input signal x1(t), a second input signal x2(t), and/or a third input signal x3(t). The first input signal x1(t) may include the speech signal s(t) and a first noise signal n1(t). The second input signal x2(t) may include the speech signal s(t) and a second noise signal n2(t). The third input signal x3(t) may include the speech signal s(t) and a third noise signal n3(t). For convenience sake, the microphone array 100 is illustrated as including three microphones. However, the number of microphones included in the microphone array 100 is not limited thereto.

The sampling circuit 200 may receive a plurality of analog signals from the microphone array 100 and may convert the plurality of analog signals into a plurality of digital signals. Specifically, the sampling circuit 200 may receive the first input signal x1(t), the second input signal x2(t), and/or the third input signal x3(t) and may generate a first digital signal X1(k,l), a second digital signal X2(k,l), and/or a third digital signal X3(k,l). The sampling circuit 200 may generate a digital signal X(k,l) by performing sampling and quantization on an analog signal x(t). For example, the sampling circuit 200 may generate the digital signal X(k,l) by performing discrete Fourier Transform (DFT), short-time Fourier Transform (STFT), or fast Fourier Transform (FFT) on the analog signal x(t). The digital signal X(k,l) may be represented by EQUATION 2.

$$X(k,l)=S(k,l)+N(k,l) \quad \text{[EQUATION 2]}$$

k represents a frequency index, l represents a frame index, S(k,l) represents a digital signal of an analog speech signal s(t), and N(k,l) represents a digital signal of an analog noise signal n(t). Because a digital signal is obtained by converting an analog input signal, hereinafter, an input signal may mean an analog input signal or a digital input signal.

The spatial filtering circuit 300 may generate a spatial filtering signal Y(k,l) by performing spatial filtering on digital signals received from the sampling circuit 200. The spatial filtering may be a filtering method of amplifying the input signal received in the direction of interest and suppressing the input signals received in the other directions. The spatial filtering signal Y(k,l) may be represented by EQUATION 3.

$$Y(k, l) = \sum_{i=0}^{N-1} X_i(k, l) W_i(k, l) \quad \text{[EQUATION 3]}$$

N represents the number of microphones included in the microphone array 100, $X_j(k,l)$ represents a digital signal for an input signal input to an ith microphone, and $W_j(k,l)$ represents a weight suppressing the noise signals in the other directions excluding the direction of interest among the noise signals input to the microphone array 100. In order to determine $W_i(k,l)$, a beamforming algorithm may be applied. The beamforming algorithm may be based on minimum variance solution or singular value decomposition. However, the inventive concepts are not limited thereto.

The noise estimation circuit 400 may receive the digital signal and the spatial filtering signal and may estimate the level of the noise signal. That is, the noise estimation circuit 400 may generate the noise estimation information es_noise representing the level of the noise signal included in the input signal. The noise estimation circuit 400 may include the directional noise estimation circuit 410 and the diffuse noise estimation circuit 420. The directional noise estimation circuit 410 may generate the directional noise information based on the spatial filtering signal and the SPP. The directional noise information may represent the level of the noise signal received in the direction of interest. For example, the directional noise information may represent the dispersion of the directional noise signal. The diffuse noise estimation circuit 420 may generate coherence information among the input signals and may generate the diffuse noise information based on the coherence information. The diffuse noise information may represent the levels of the noise signals with the uniform weight for the various directions. For example, the diffuse noise information may represent the dispersion of the diffuse noise signal. The noise estimation circuit 400 may generate the noise estimation information es_noise by integrating the directional noise information with the diffuse noise information based on the directionality determined by using the coherence information.

The speech estimation circuit 500 may receive the spatial filtering signal and the noise estimation information es_noise and may generate the estimated speech signal es(t). The speech estimation circuit 500 may generate a gain based on the noise estimation information es_noise and may estimate a reliable speech signal by performing filtering for removing noise from the spatial filtering signal by using the generated gain. The speech estimation circuit 500 may estimate a speech signal by using a wiener filter. Specifically, the speech estimation circuit 500 may generate the gain to which the estimated noise information es_noise is reflected by using the wiener filter and may generate the estimated speech signal by multiplying the generated gain by the spatial filtering signal.

Figure 3:
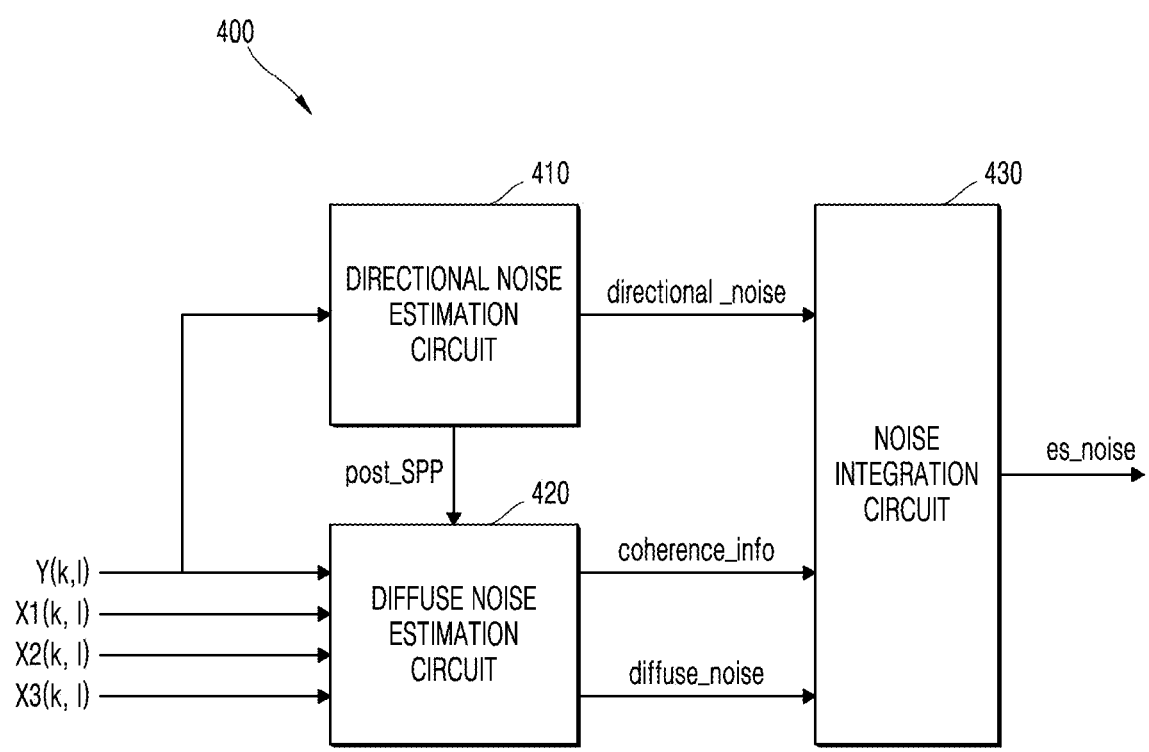
FIG. 3 is a block diagram specifically illustrating a noise estimation circuit according to some example embodiments of the inventive concepts.

FIG. 3 is a block diagram specifically illustrating the noise estimation circuit 400 according to some example embodiments of the inventive concepts.

Referring to FIG. 3, the noise estimation circuit 400 may include the directional noise estimation circuit 410, the diffuse noise estimation circuit 420, and a noise integration circuit 430.

The directional noise estimation circuit 410 may receive the spatial filtering signal and may generate the SPP and directional noise signal information directional noise. The SPP may represent the probability that a received input signal includes a speech signal. The directional noise information may represent the level of the noise signal received in the direction of interest. Therefore, the directional noise information may be used for estimating the directional noise signal.

The directional noise estimation circuit 410 may generate directional noise information on a current frame by using a recursive filter. The recursive filter may reuse an output as an input. Specifically, the directional noise estimation circuit 410 may reuse directional noise information on a previous frame as an input. The directional noise estimation circuit 410 may generate the directional noise information on the current frame by using a directional noise signal for a previous frame and the spatial filtering signal as an input and using posteriori SPP post_SPP as a weight.

The diffuse noise estimation circuit 420 may receive the spatial filtering signal, the input signal, and the posteriori SPP post_SPP and may generate the coherence information coherence_info and the diffuse noise information diffuse noise. The coherence information coherence_info may represent correlation among the input signals. For example, the coherence information coherence_info may represent correlation between an amplitude of a first input signal and an amplitude of a second input signal. The diffuse noise information may represent the levels of the noise signals with the uniform weight for the various directions. The diffuse noise information may be used for estimating the non-directional noise signal.

The diffuse noise estimation circuit 420 may generate the coherence information coherence_info by using power spectral density (PSD) among the input signals. The diffuse noise estimation circuit 420 may generate intermediate noise information by using the PSD and the coherence information coherence_info. The diffuse noise estimation circuit 420 may generate the diffuse noise information diffuse_noise by using the intermediate noise information and the spatial filtering signal as an input and using the posteriori SPP post_SPP as a weight.

The noise integration circuit 430 may generate the estimated noise information es_noise by integrating the directional noise information directional noise with the diffuse noise information diffuse_noise. The estimated noise information es_noise may be an estimated value of an amplitude of a noise signal included in the plurality of input signals. Specifically, the noise integration circuit 430 may linearly combine the directional noise information directional_noise with the diffuse noise information diffuse_noise so that a ratio of the directional noise information directional_noise increases as coherence among the plurality of input signals is high and a ratio of the diffuse noise information diffuse_noise increases as coherence among the plurality of input signals is low.

Figure 4:
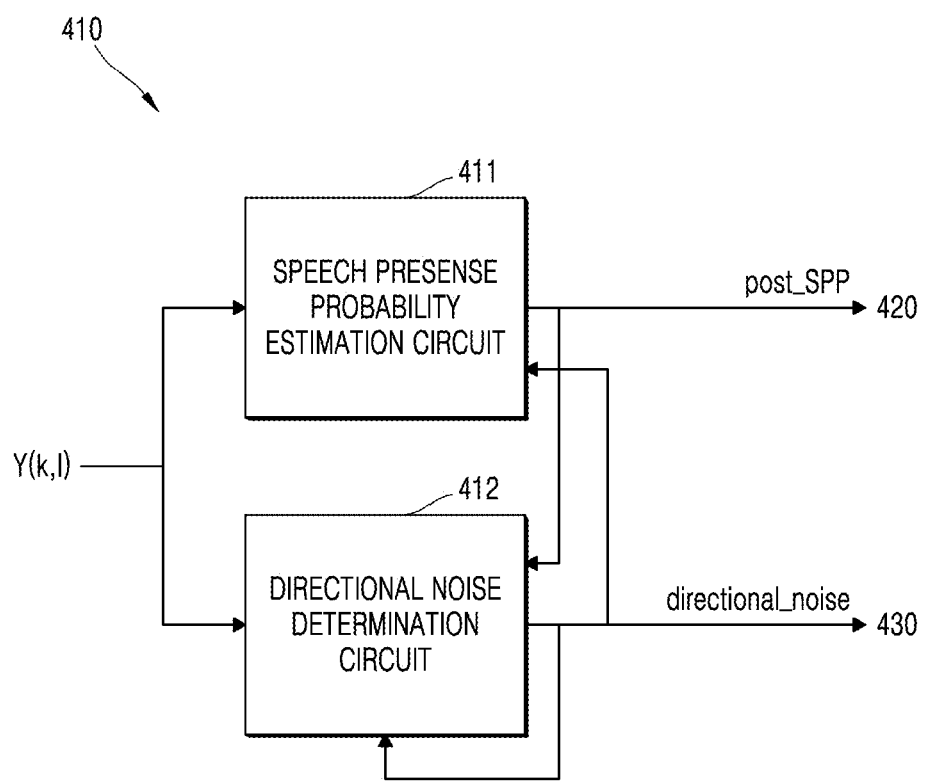
FIG. 4 is a block diagram specifically illustrating a directional noise estimation circuit according to some example embodiments of the inventive concepts.

FIG. 4 is a block diagram specifically illustrating the directional noise estimation circuit 410 according to some example embodiments of the inventive concepts.

Referring to FIG. 4, the directional noise estimation circuit 410 may include a speech presence probability estimation circuit 411 and a directional noise determination circuit 412.

The speech presence probability estimation circuit 411 may receive the spatial filtering signal Y(k,l) and may generate the posteriori SPP post_SPP. The speech presence probability estimation circuit 411 may generate the posteriori SPP post_SPP in accordance with the bayes' theorem. The posteriori SPP post_SPP in accordance with the bayes' theorem may be represented by EQUATION 4.

$$P(H_1 \mid Y) = \frac{P(H_1)P(Y \mid H_1)}{P(H_0)P(Y \mid H_0) + P(H_1)P(Y \mid H_1)} \quad \text{[EQUTAION 4]}$$

wherein, $P(H_1|Y)$ may represent the posteriori SPP, $P(H_1)$ may represent prior SPP, $P(H_0)$ may represent prior speech absence probability (SAP), $P(Y|H_1)$ may represent the likelihood of speech presence, and $P(Y|H_0)$ may represent the likelihood of speech absence. The sum of the prior SPP $P(H_1)$ and the prior SAP $P(H_0)$ may be 1. The prior SPP $P(H_1)$ and the prior SAP $P(H_0)$ may be set as previously determined (or alternately given) values. For example, each of the prior SPP $P(H_1)$ and the prior SAP $P(H_0)$ may be set as 0.5.

In accordance with the Gaussian dispersion model, the likelihood of speech presence $P(Y|H_1)$ and the likelihood of speech absence $P(Y|H_0)$ may be respectively represented by [EQUATION 5] and [EQUATION 6].

$$P(H_1) = \frac{1}{\lambda_{ndirect}(k, l-1)(1+\xi_{H_1})\pi} \exp\left(-\frac{|Y(k,l)|^2}{\lambda_{ndirect}(k, l-1)(1+\xi_{H_1})}\right) \quad \text{[EQUATION 5]}$$

wherein, $\lambda_{ndirect}(k,l-1)$ may represent dispersion of the directional noise signal for the previous frame when the directional noise signal is Gaussian modeled. In an example embodiment according to the inventive concepts, the directional noise information directional noise may represent dispersion of the directional noise signal. $\xi_{H_1}$ may represent a prior signal-to-noise ratio (SNR). The prior SNR may be set as a previously determined (or alternately given) value. For example, the prior SNR may be set as 30 dB.

$$P(Y \mid H_0) = \frac{1}{\lambda_{ndirect}(k, l-1)\pi} \exp\left(-\frac{|Y(k,l)|^2}{\lambda_{ndirect}(k, l-1)}\right) \quad \text{[EQUATION 6]}$$

As a result, the speech presence probability estimation circuit 411 may obtain the posteriori SPP post_SPP in accordance with [EQUATION 7]. [EQUATION 7] may be determined by substituting the likelihood of speech presence $P(Y|H_1)$ in accordance with [EQUATION 5] and the likelihood of speech absence $P(Y|H_0)$ in accordance with [EQUATION 6] for [EQUATION 4].

$$P(H_1 \mid Y) = \left(1 + \frac{P(H_0)}{P(H_1)}(1+\xi_{H_1})\exp\left(-\frac{|Y(k,l)|^2 \xi_{H_1}}{\lambda_{ndirect}(k, l-1)(1+\xi_{H_1})}\right)\right)^{-1} \quad \text{[EQUATION 7]}$$

Because the prior SPP $P(H_1)$, the prior SAP $P(H_0)$, and the prior $\xi_{H_1}$ may be set as previously determined (or alternately given) values, the speech presence probability estimation circuit 411 may obtain the posteriori SPP post_SPP by using the spatial filtering signal $Y(k,l)$ and the dispersion $\lambda_{ndirect}(k,l-1)$ of the directional noise signal for the previous frames.

The directional noise determination circuit 412 may generate dispersion $\lambda_{ndirect}(k,l)$ of the directional noise signal for the current frame by using the posteriori SPP $P(H_1|Y)$, the posteriori SAP $P(H_0|Y)$, the spatial filtering signal $Y(k,l)$, and the dispersion $\lambda_{ndirect}(k,l-1)$ of the directional noise signal for the previous frame. Specifically, the directional noise determination circuit 412 may obtain the dispersion $\lambda_{ndirect}(k,l)$ of the directional noise signal for the current frame in accordance with [EQUATION 8].

$$\lambda_{ndirect}(k,l) = P(H_0|Y)|Y(k,l)|^2 + P(H_1|Y)\lambda_{ndirect}(k,l-1) \quad \text{[EQUATION 8]}$$

wherein, $\lambda_{ndirect}(k,l)$ may represent the dispersion of the directional noise signal for the current frame when the directional noise signal is Gaussian modeled. The sum of the posteriori SPP $P(H_1|Y)$ and the posteriori SAP $P(H_0|Y)$ may be 1.

In accordance with [EQUATION 8], the directional noise determination circuit 412 may generate the dispersion $\lambda_{ndirect}(k,l)$ of the directional noise signal for the current frame by increasing the effect of the directional noise signal, $\lambda_{ndirect}(k,l-1)$ for the previous frame when the posteriori SPP $P(H_1|Y)$ is high and increasing the effect of the spatial filtering signal $Y(k,l)$ when the posteriori SAP $P(H_0|Y)$ is high. In an example embodiment according to the inventive concepts, the directional noise information directional noise may represent the dispersion of the directional noise signal.

Figure 5:
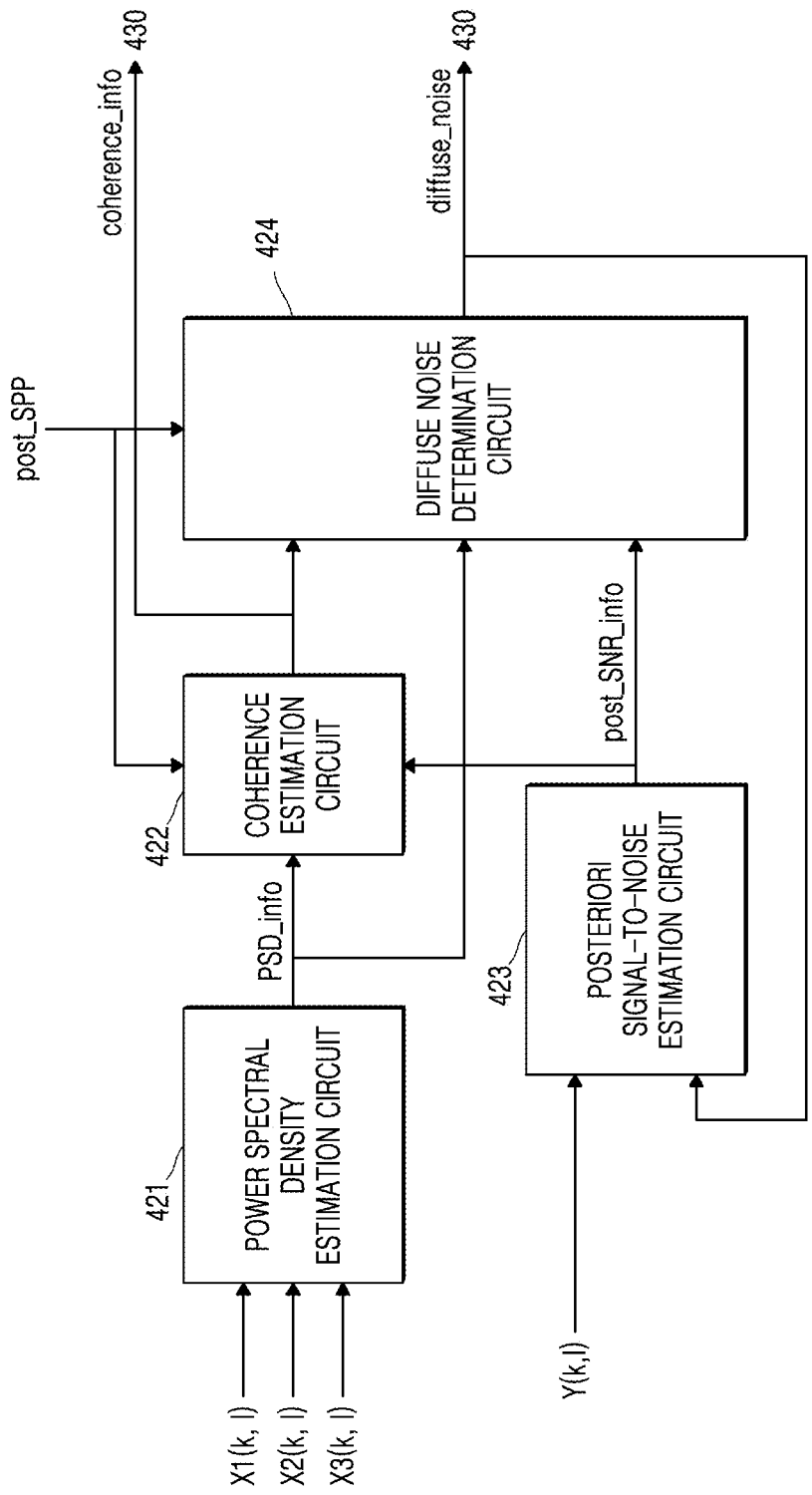
FIG. 5 is a block diagram specifically illustrating a diffuse noise estimation circuit according to some example embodiments of the inventive concepts.

FIG. 5 is a block diagram specifically illustrating the diffuse noise estimation circuit 420 according to some example embodiments of the inventive concepts.

Referring to FIG. 5, the diffuse noise estimation circuit 420 may include a power spectrum density estimation circuit 421, a coherence estimation circuit 422, a posteriori SNR estimation circuit 423, and a diffuse noise determination circuit 424.

The power spectrum density estimation circuit 421 may receive the plurality of input signals and may generate power spectrum density information PSD_info. The power spectrum density information PSD_info may include auto power spectral density (PSD) and cross PSD. Specifically, the power spectrum density estimation circuit 421 may generate the auto PSD in accordance with [EQUATION 9] and may generate the cross PSD in accordance with [EQUATION 10].

$$\hat{\Phi}_{x_i x_i}(k,l) = \alpha_s \hat{\Phi}_{x_i x_i}(k,l-1) + (1-\alpha_s)X_i(k,l)X_i^*(k,l) \quad \text{[EQUATION 9]}$$

wherein, $\hat{\Phi}_{x_i x_i}(k,l)$ may represent auto PSD for a current frame of an ith input signal, $\hat{\Phi}_{x_i x_i}(k,l-1)$ may represent auto PSD for a previous frame of the ith input signal, $\alpha_s$ may represent a smoothing parameter, and $X_i(k,l)$ may represent a frequency component of the ith input signal.

$$\hat{\Phi}_{x_i x_j}(k,l) = \alpha_s \hat{\Phi}_{x_i x_j}(k,l-1) + (1-\alpha_s)X_i(k,l)X_j^*(k,l) \quad \text{[EQUATION 10]}$$

wherein, $\hat{\Phi}_{x_i x_j}(k,l)$ may represent cross PSD between an ith input signal and a jth input signal for a current frame, $\hat{\Phi}_{x_i x_j}(k,l-1)$ may represent cross PSD between an ith input signal and a jth input signal for a previous frame, and $X_j(k,l)$ may represent a frequency component of a jth input signal.

The posteriori SNR estimation circuit 423 may receive the spatial filtering signal and may generate posteriori SNR information post_SNR_info. The posteriori SNR estimation circuit 423 may generate the posteriori SNR information post_SNR_info in accordance with [EQUATION 11].

$$\hat{\gamma}(k,l) = \frac{|Y(k,l)|^2}{\lambda_{ndiffuse}(k, l-1)} \quad \text{[EQUATION 11]}$$

wherein, $\hat{y}(k,l)$ may represent a posteriori SNR and $\lambda_{ndiffuse}(k,l-1)$ may represent dispersion of a diffuse noise signal for a previous frame when the diffuse noise signal is Gaussian modeled. In another embodiment of the inventive concepts, the diffuse noise information diffuse noise may represent the dispersion of the diffuse noise signal.

The coherence estimation circuit 422 may receive PSD information PSD info and the posteriori SNR information post_SNR_info and may generate the coherence information coherence_info. The coherence information coherence_info may include input signal coherence among the input signals, speech signal coherence among speech signals, and noise signal coherence among noise signals.

Specifically, the coherence estimation circuit 422 may obtain the input signal coherence $\hat{\Gamma}_{x_ix_j}(k,l)$ among the input signals in accordance with [EQUATION 12].

$$\hat{\Gamma}_{x_ix_j}(k,l) = \frac{\hat{\Phi}_{x_ix_j}(k,l)}{\sqrt{\hat{\Phi}_{x_ix_i}(k,l)\hat{\Phi}_{x_jx_j}(k,l)}} \quad \text{[EQUATION 12]}$$

Furthermore, the coherence estimation circuit 422 may obtain the noise signal coherence $\hat{\Gamma}_{n_in_j}(k,l)$ between the noise signals in accordance with [EQUATION 13].

$$\hat{\Gamma}_{n_in_j}(k,l) = \begin{cases} \alpha_\Gamma \hat{\Gamma}_{n_in_j}(k,l-1) + \\ (1-\alpha_\Gamma)\hat{\Gamma}_{x_ix_j}(k,l) \end{cases}, \quad P(H_1|Y) < P_{thr1} \\ \hat{\Gamma}_{n_in_j}(k,l) = \hat{\Gamma}_{n_in_j}(k,l-1), \quad P(H_1|Y) \geq P_{thr1} \quad \text{[EQUATION 13]}$$

wherein, $\alpha_\Gamma$ may represent a smoothing parameter and $P_{thr1}$ may represent a first threshold value.

That is, the coherence estimation circuit 422 may generate the noise signal coherence $\hat{\Gamma}_{n_in_j}(k,l)$ considering the input signal coherence $\hat{\Gamma}_{x_ix_j}(k,l)$ when the posteriori SPP $P(H_1|Y)$ is less than the first threshold value $P_{thr1}$. The coherence estimation circuit 422 may use noise signal coherence $\hat{\Gamma}_{n_in_j}(k,l-1)$ for a previous frame as noise signal coherence $\hat{\Gamma}_{n_in_j}(k,l)$ for a current frame when the posteriori SPP $P(H_1|Y)$ is equal to or greater than the first threshold value $P_{thr1}$.

Furthermore, the coherence estimation circuit 422 may generate the speech signal coherence $\hat{\Gamma}_{s_is_j}(k,l)$ between the speech signals in accordance with [EQUATION 14].

$$\hat{\Gamma}_{s_is_j}(k,l) = \\ \alpha_\Gamma \hat{\Gamma}_{s_is_j}(k,l-1) + (1-\alpha_\Gamma) \left( \frac{\hat{y}(k,l)}{\hat{y}(k,l)-1}\hat{\Gamma}_{x_ix_j}(k,l) - \frac{1}{\hat{y}(k,l)-1}\hat{\Gamma}_{n_in_j}(k,l) \right), \\ \hat{\Gamma}_{s_is_j}(k,l-1), \\ P(H_1|Y) < P_{thr2} \quad \text{[EQUATION 14]}$$

That is, the coherence estimation circuit 422 may generate the speech signal coherence $\hat{\Gamma}_{s_is_j}(k,l)$ considering the input signal coherence $\hat{\Gamma}_{x_ix_j}(k,l)$ and the noise signal coherence $\hat{\Gamma}_{n_in_j}(k,l)$ when the posteriori SPP $P(H_1|Y)$ is equal to or greater than a second threshold value $P_{thr2}$. The coherence estimation circuit 422 may use the speech signal coherence $\hat{\Gamma}_{s_is_j}(k,l-1)$ for the previous frame as the speech signal coherence for the current frame when the posteriori SPP $P(H_1|Y)$ is less than the second threshold value $P_{thr2}$.

The diffuse noise determination circuit 424 may generate the intermediate noise information by using the PSD information PSD_info and the coherence information coherence_info. Specifically, the diffuse noise determination circuit 424 may generate the intermediate noise information in accordance with [EQUATION 15].

$$\lambda_{inter}(k,l) = \frac{\frac{1}{M}\sum_{i=0}^{M-1}\hat{\Phi}_{x_ix_i}(k,l) - \frac{\sum_{j=0(j\neq i)}^{M-1}\sum_{i=0}^{M-1}\hat{\Phi}_{x_ix_j}(k,l)}{\sum_{j=0(j\neq i)}^{M-1}\sum_{i=0}^{M-1}\hat{\Gamma}_{s_is_j}(k,l-1)}}{1 - \frac{\sum_{j=0(j\neq i)}^{M-1}\sum_{i=0}^{M-1}\hat{\Gamma}_{n_in_j}(k,l)}{\sum_{j=0(j\neq i)}^{M-1}\sum_{i=0}^{M-1}\hat{\Gamma}_{s_is_j}(k,l-1)}} \quad \text{[EQUATION 15]}$$

wherein, $\lambda_{inter}(k,l)$ may represent the intermediate noise information. The intermediate noise information may represent levels of noise signals received in various directions.

The diffuse noise determination circuit 424 may generate the diffuse noise information diffuse_noise by using the intermediate noise information $\lambda_{inter}(k,l)$ and the spatial filtering signal $Y(k,l)$ as an input and using the posteriori SPP post_SPP as a weight. Specifically, the diffuse noise determination circuit 424 may generate the diffuse noise information diffuse_noise in accordance with [EQUATION 16].

$$\lambda_{ndiffuse}(k,l) = P(H_0|Y)|Y(k,l)|^2 + P(H_1|Y)\lambda_{inter}(k,l) \quad \text{[EQUATION 16]}$$

wherein, $\lambda_{ndiffuse}(k,l)$ may represent dispersion of the diffuse noise signal for the current frame when the diffuse noise signal is Gaussian modeled. The sum of the posteriori SPP $P(H_1|Y)$ and the posteriori SAP $P(H_0|Y)$ may be 1.

In accordance with [EQUATION 16], the diffuse noise determination circuit 424 may generate the dispersion $\lambda_{ndiffuse}(k,l)$ of the diffuse noise signal for the current frame by increasing the effect of the intermediate noise information $\lambda_{inter}(k,l)$ when the posteriori SPP $P(H_1|Y)$ is high and increasing the effect of the spatial filtering signal $Y(k,l)$ when the posteriori SAP $P(H_0|Y)$ is high. In an example embodiment of the inventive concepts, the diffuse noise information diffuse_noise may represent the dispersion of the diffuse noise signal.

Figure 6:
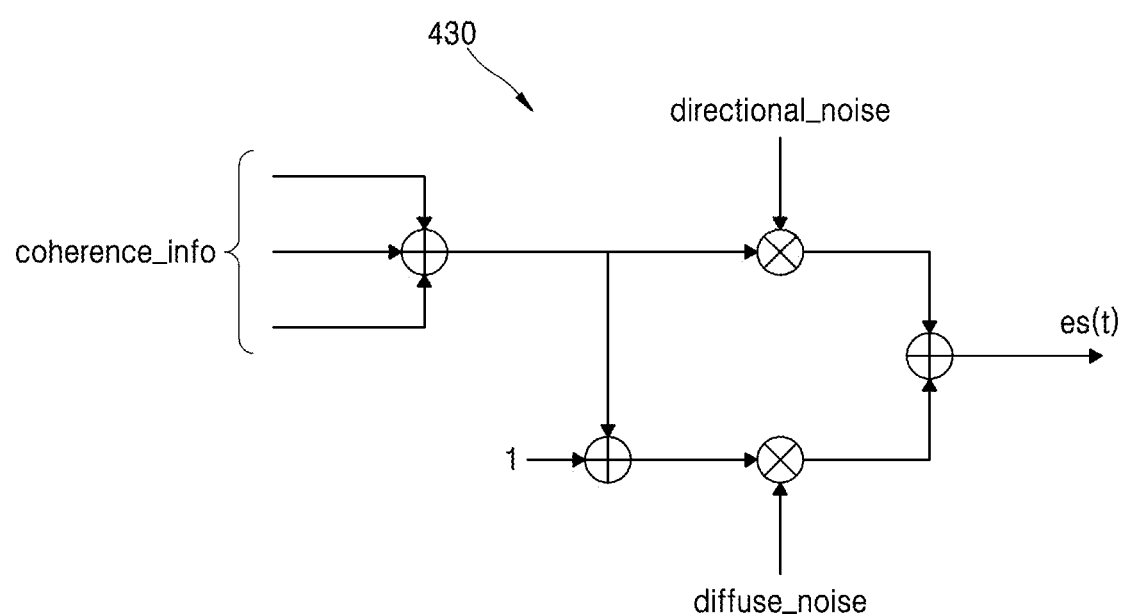
FIG. 6 is a view specifically illustrating a noise integration circuit according to some example embodiments of the inventive concepts.

FIG. 6 is a view specifically illustrating the noise integration circuit 430 according to some example embodiments of the inventive concepts.

Referring to FIG. 6, the noise integration circuit 430 may receive the coherence information coherence_info, the directional noise information directional_noise, and the diffuse noise information diffuse_noise and may generate the estimated noise information es_noise. Specifically, the noise integration circuit 430 may generate the estimated noise information es_noise in accordance with [EQUATION 17]. The estimated noise information es_noise may be the estimated value of the amplitude of the noise signal included in the plurality of input signals.

$$\lambda_n(k, l) = \lambda_{ndirect}(k, l) \sum_{j=0(j\neq i)}^{M-1} \sum_{j=0}^{M-1} \hat{\Gamma}_{x_i x_j}(k, l) + \lambda_{ndiffuse}(k, l)\left(1 - \sum_{j=0(j\neq i)}^{M-1} \sum_{j=0}^{M-1} \hat{\Gamma}_{x_i x_j}(k, l)\right)$$ [EQUATION 17]

In accordance with [EQUATION 17], the noise integration circuit 430 may generate the estimated noise information es_noise $\lambda_n(k,l)$ by increasing the effect of the directional noise information $\lambda_{ndirect}(k,l)$ when the input signal coherence is high and increasing the effect of the diffuse noise information $\lambda_{ndiffuse}(k,l)$ when the input signal coherence is low.

When the input signal coherence is high, correlation among the input signals received by the plurality of microphones may be high. The input signal coherence may be proportional to directionality of an input signal.

That is, the noise integration circuit 430 may control a ratio between the directional noise information and the diffuse noise information included in the estimated noise information es_noise in accordance with directionality.

Specifically, the noise integration circuit 430 may reliably estimate an input noise signal by increasing a ratio of the directional noise information $\lambda_{ndirect}(k,l)$ used for estimating the directional noise signal when directionality of the input signals is high and increasing a ratio of the diffuse noise information $\lambda_{ndiffuse}(k,l)$ used for estimating the non-directional noise signal when directionality of the input signals is low.

Figure 7:
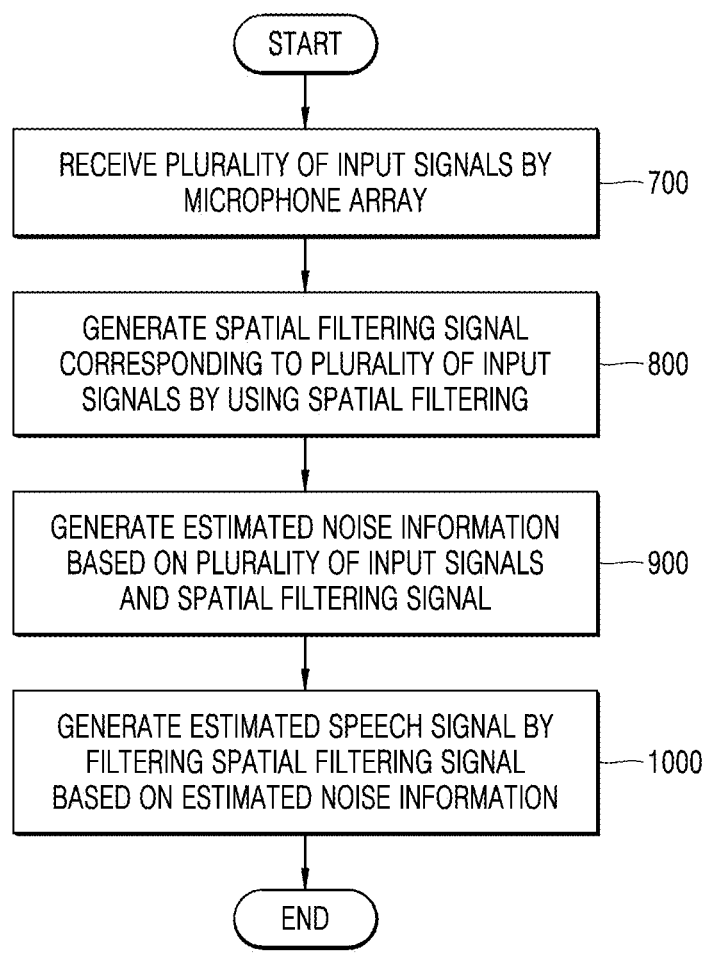
FIG. 7 is a flowchart illustrating a speech estimating method according to some example embodiments of the inventive concepts.

FIG. 7 is a flowchart illustrating a speech estimating method according to some example embodiments of the inventive concepts.

Referring to FIG. 7, in operation 700, the plurality of input signals may be received by the microphone array 100. The microphone array 100 may include a plurality of microphones.

In operation 800, the spatial filtering signal corresponding to the plurality of input signals may be generated by the spatial filtering circuit 300. The spatial filtering may be a filtering method of amplifying the input signal received in the direction of interest and suppressing the input signals received in the other directions.

In operation 900, based on the plurality of input signals and the spatial filtering signal, the estimated noise information representing the level of the noise signal included in the input signal may be generated. Specifically, in operation 900, the estimated noise information may be generated by integrating the directional noise information with the diffuse noise information.

In operation 1000, the estimated noise signal may be generated by filtering the spatial filtering signal again based on the estimated noise information.

By the noise filtering method according to the inventive concepts, a reliable speech signal may be estimated by generating the spatial filtering signal from the input signal through the spatial filtering and filtering the spatial filtering signal again based on the estimated noise information.

Figure 8:
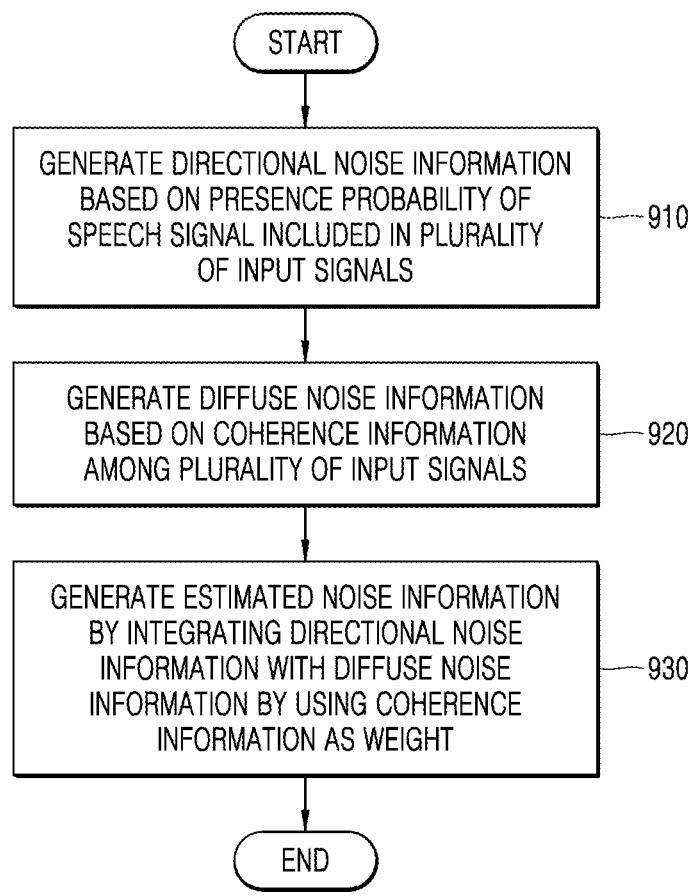
FIG. 8 is a flowchart illustrating a noise estimating method according to some example embodiments of the inventive concepts.

FIG. 8 is a flowchart illustrating a noise estimating method according to some example embodiments of the inventive concepts.

FIG. 8 may be a flowchart specifically illustrating operation 900 of FIG. 7. Referring to FIG. 8, in operation 910, the presence probability of the noise signal included in the plurality of input signals is generated and the directional noise information may be generated based on the SPP. The directional noise information may represent the level of the noise signal received in the direction of interest. Because an operation of the directional noise estimation circuit 410 described with reference to FIGS. 3 and 4 may be included in operation 910, previously given description will be omitted.

In operation 920, the diffuse noise information may be generated based on the coherence information among the plurality of input signals. The diffuse noise information may represent the levels of the noise signals with the uniform weight for the various directions. Because operation 920 may include an operation of the diffuse noise estimation circuit 420 described with reference to FIGS. 3 and 5, previously given description will be omitted.

In operation 930, the estimated noise information may be generated by integrating the directional noise information with the diffuse noise information by using the coherence information among the plurality of input signals as the weight. Because operation 930 may include an operation of the noise integration circuit 430 described with reference to FIGS. 3 and 6, previously given description will be omitted.

By the noise estimating method according to the inventive concepts, by using the coherence information as the parameter representing the directionality of the input signal, the ratio between the directional noise information and the diffuse noise information included in the estimated noise information may be set. That is, the reliable noise signal may be estimated by improving or optimizing the ratio between two noise information items included in the estimated noise information in accordance with the directionality of the input signal.

Figure 9:
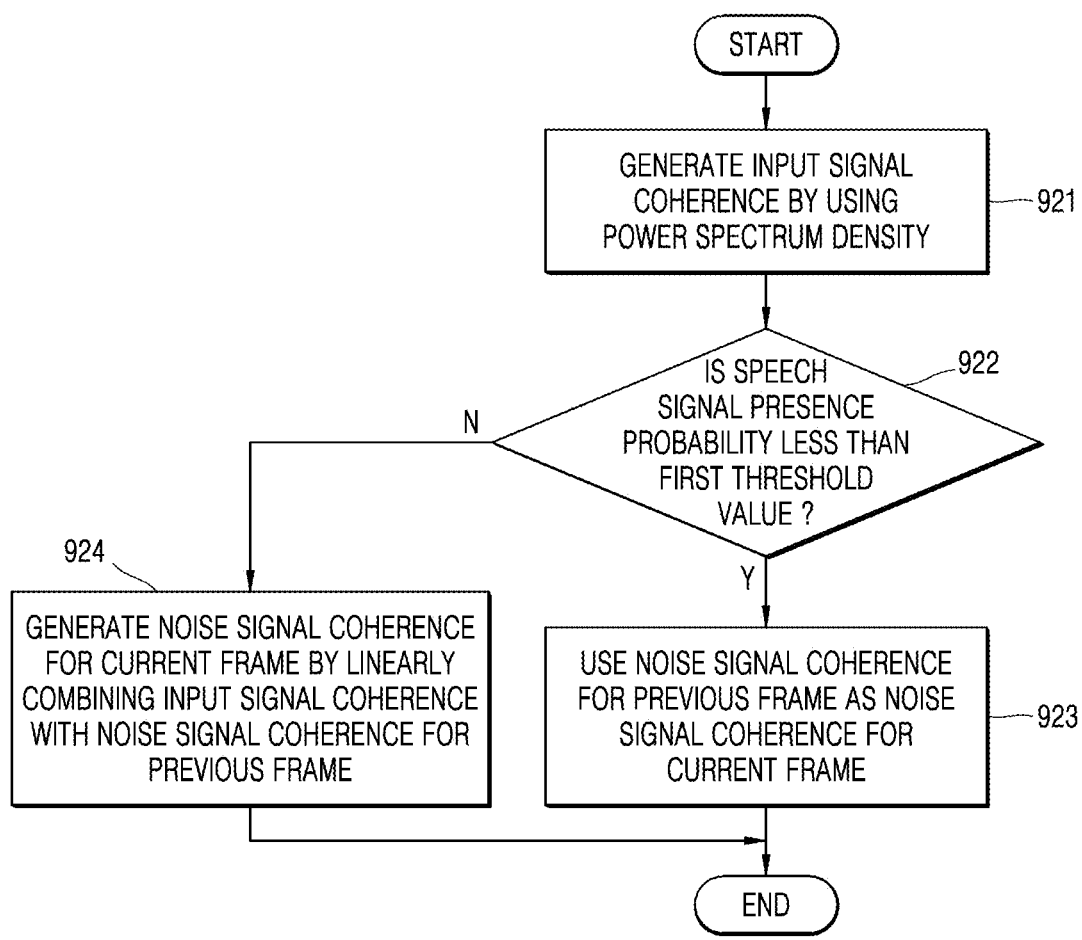
FIG. 9 is a flowchart illustrating a method of generating noise signal coherence, according to some example embodiments of the inventive concepts.

FIG. 9 is a flowchart illustrating a method of generating noise signal coherence, according to some example embodiments of the inventive concepts.

Referring to FIG. 9, in operation 921, the coherence estimation circuit 422 may generate the input signal coherence by using the PSD of the input signal.

In operation 922, operation 923 may be performed when the SPP is less than a first threshold value and operation 924 may be performed when the SPP is equal to or greater than the first threshold value.

In operation 923, the coherence estimation circuit 422 may use the noise signal coherence for the previous frame as the noise signal coherence for the current frame.

In operation 924, the coherence estimation circuit 422 may generate the noise signal coherence for the current frame by weighting the input signal coherence and the noise signal coherence for the previous frame.

Figure 10:
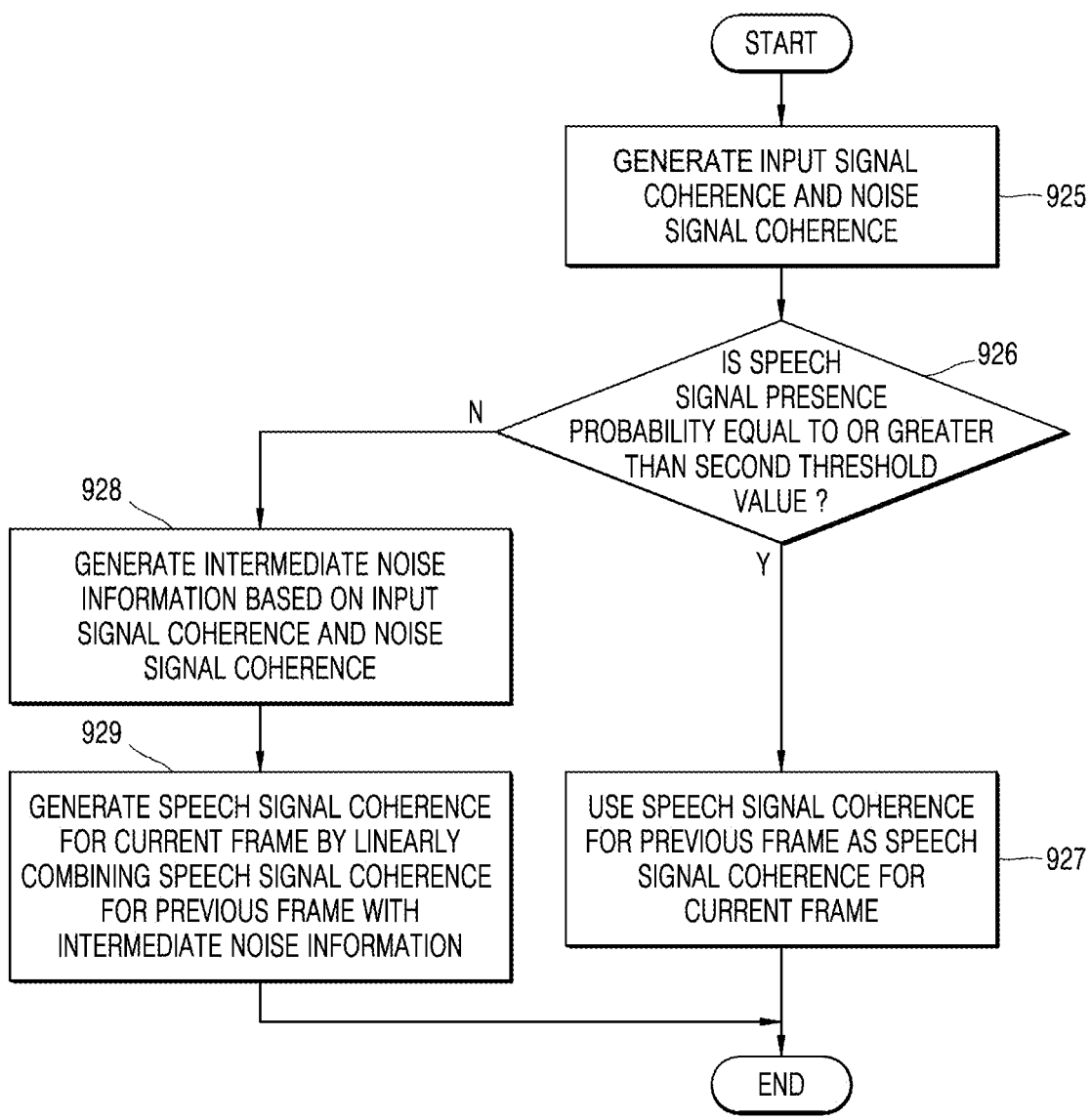
FIG. 10 is a flowchart illustrating a method of generating speech signal coherence, according to some example embodiments of the inventive concepts.

FIG. 10 is a flowchart illustrating a method of generating speech signal coherence according to some example embodiments of the inventive concepts.

Referring to FIG. 10, in operation 925, the coherence estimation circuit 422 may generate the input signal coherence and the noise signal coherence. Operation 925 may include operation 921 and operation 924 described in FIG. 9.

In operation 926, operation 927 may be performed when the SPP is equal to or greater than the second threshold value and operation 928 may be performed when the SPP is less than the second threshold value.

In operation 927, the coherence estimation circuit 422 may use the speech signal coherence for the previous frame as the speech signal coherence for the current frame.

In operation 928, the coherence estimation circuit 422 may generate the intermediate noise information based on the PSD, the input signal coherence, and the noise signal coherence.

In operation 929, the coherence estimation circuit 422 may generate the noise signal coherence for the current frame by weighting the speech signal coherence for the previous frame and the intermediate noise information.

Figure 11:
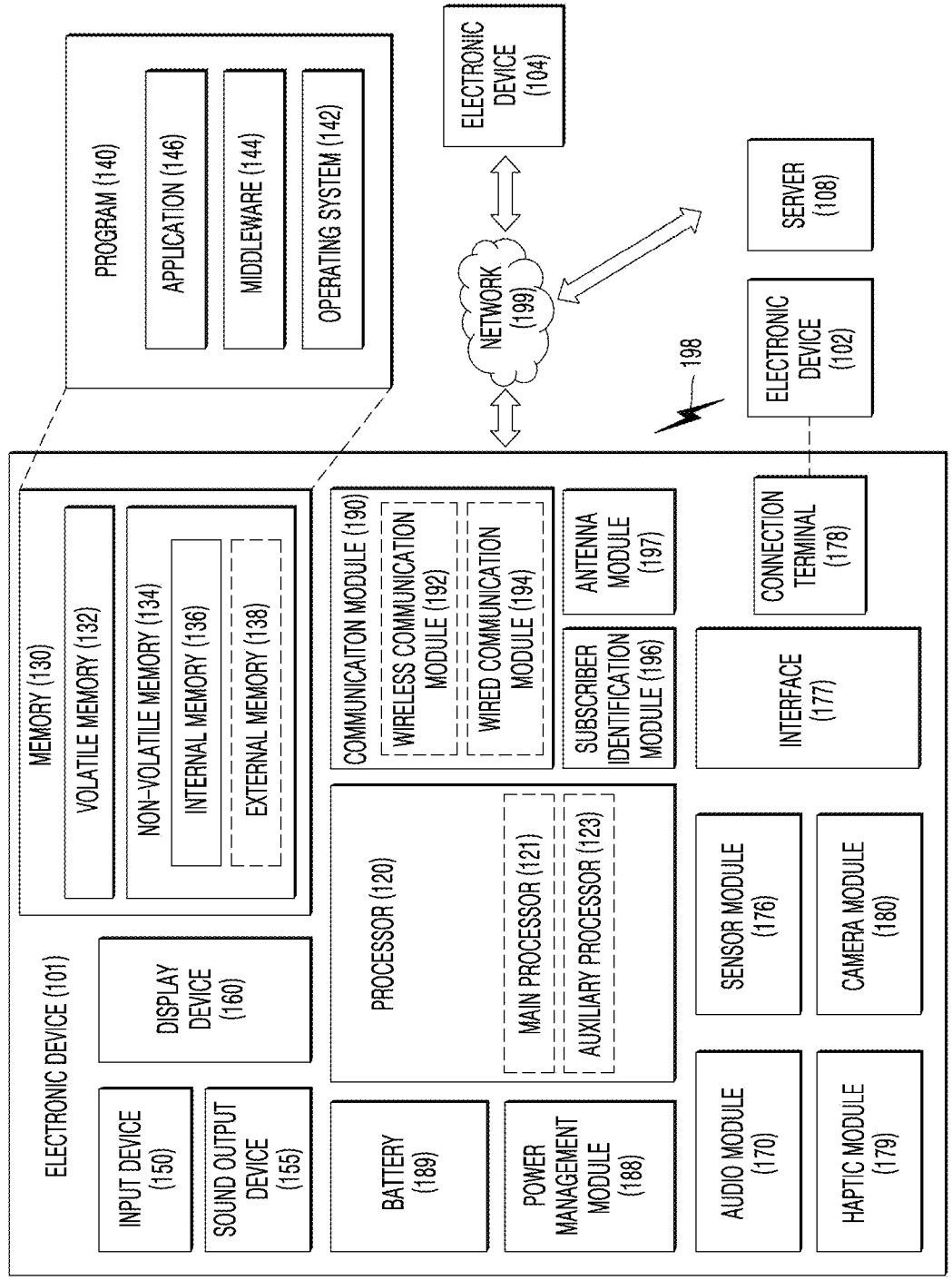
FIG. 11 is a block diagram illustrating electronic devices according to some example embodiments.

FIG. 11 is a block diagram illustrating electronic devices according to some example embodiments.

Referring to FIG. 11, an electronic device 101 may communicate with an electronic device 102 through a first network 198 (for example, short-range wireless communication) and/or may communicate with an electronic device 104 or a server 108 through a second network 199 (for example, long-distance wireless communication). According to an example embodiment, the electronic device 101 may communicate with the electronic device 104 through the server 108. According to an example embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and/or an antenna module 197.

According to an example embodiment of the inventive concepts, the electronic device 101 may include the speech processing device 10 described with reference to FIG. 1.

In an example embodiment, at least one of components (for example, the display device 160 or the camera module 180) may be omitted from the electronic device 101 and/or another component may be added to the electronic device 101. In an example embodiment, like in a case in which the sensor module 176 (for example, a fingerprint sensor, an iris sensor, or a photoresistor) is embedded in the display device 160 (for example, a display), some components may be integrated with each other.

The processor 120 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The processor 120 may control at least one other component (for example, a hardware and/or software component) of the electronic device 101 connected to the processor 120 by driving, for example, software (for example, a program 140) and may perform processing and operation of various data items. The processor 120 may load an instruction or data received from another component (for example, the sensor module 176 or the communication module 190) on a volatile memory 132, may process the loaded instruction or data, and may store resultant data in a non-volatile memory 134. According to an example embodiment, the processor 120 may include a main processor 121 (for example, a central processing unit (CPU) or an application processor) and an auxiliary processor 123 (for example, a graphics processing device, an image signal processor, a sensor hub processor, or a communication processor) independently operated from the main processor 121, additionally or generally using lower power than the main processor 121, or specialized for a designed function. The auxiliary processor 123 may be operated to be separate from or embedded in the main processor 121. In such a case, the auxiliary processor 123 may control a function or at least some of states related to at least one component (for example, the display device 160, the sensor module 176, and/or the communication module 190) among the components of the electronic device 101 instead of the main processor 121 while the main processor 121 is in an inactive state (for example, in a sleep mode) and/or together with the main processor 121 while the main processor 121 is in an active state (for example, performs an application). According to an example embodiment, the auxiliary processor 123 (for example, an image signal processor and/or a communication processor) may be implemented by a partial component of another functionally related component (for example, the camera module 180 and/or the communication module 190). The memory 130 may store various data items used by at least one component (for example, the processor 120 and/or the sensor module 176) of the electronic device 101, for example, software (for example, the program 140) and input data or output data on an instruction related thereto. The memory 130 may include the volatile memory 132 and/or the non-volatile memory 134.

In an example embodiment according to the inventive concepts, the processor 120 may control components in the electronic device 101 so that operations of the sampling circuit 200, the spatial filtering circuit 300, the noise estimation circuit 400, and the speech estimation circuit 500 described with reference to FIG. 2 are performed. That is, the processor 120 may estimate a noise signal and a speech signal from an input signal received by the input device 150.

According to an example embodiment, the program 140 as software stored in the memory 130 may include, for example, an operating system (OS) 142, middleware 144, and/or an application 146.

According to an example embodiment, the input device 150 receiving an instruction or data to be used for a component (for example, the processor 120) of the electronic device 101 from the outside of the electronic device 101 (for example, a user) may include, for example, a microphone, a mouse, and/or a keyboard. According to an example embodiment of the inventive concepts, the input device 150 may be the microphone array 100 described with reference to FIG. 2.

According to an example embodiment, the sound output device 155 outputting a sound signal to the outside of the electronic device 101 may include, for example, a speaker used for a common purpose such as multimedia reproduction or recording reproduction and a receiver used for telephone reception only. According to an example embodiment, the receiver may be integrated with or separate from the speaker.

According to an example embodiment, the display device 160 visually providing information to the user of the electronic device 101 may include, for example, a display, a hologram device, and/or a projector and a control circuit controlling the corresponding device. According to an example embodiment, the display device 160 may include a pressure sensor capable of measuring an amplitude of pressure for a touch circuitry or a touch.

According to an example embodiment, the audio module 170 may interactively convert a sound and an electrical signal. According to an example embodiment, the audio module 170 may obtain a sound through the input device 150 and/or may output a sound through the sound output device 155 and/or an external electronic device (for example, the electronic device 102 (for example, a speaker or a headphone)) connected to the electronic device 101 by wire and/or wirelessly.

According to an example embodiment, the sensor module 176 may generate an electrical signal or a data value corresponding to an operating state (for example, power and/or a temperature) in the electronic device 101 and/or an external environment state. The sensor module 176 may include, for example, a gesture sensor, a gyrosensor, an air pressure sensor, a magnetic sensor, an acceleration sensor, a grip sensor, a proximity sensor, a color sensor, an infrared (IR) sensor, a biological sensor, a temperature sensor, a humidity sensor, and/or a photoresistor.

According to an example embodiment, the interface 177 may support a designated protocol that may be connected to an external electronic device (for example, the electronic device 102) by wire and/or wirelessly. According to an example embodiment, the interface 177 may include a high definition multimedia interface (HDMI), a universal serial bus (USB) interface, a secure digital (SD) card interface, and/or an audio interface.

According to an example embodiment, a connection terminal 178 may include a connector physically connecting the electronic device 101 to the external electronic device (for example, the electronic device 102), for example, an HDMI connector, a USB connector, an SD card connector, and/or an audio connector (for example, a headphone connector).

According to an example embodiment, the haptic module 179 may convert an electrical signal into a mechanical stimulation (for example, a vibration or motion) and/or an electrical stimulation that may be sensed by the user through a sense of touch and/or a kinesthetic sensor. The haptic module 179 may include, for example, a motor, a piezoelectric element and/or an electric stimulation device.

According to an example embodiment, the camera module 180 may capture a still image and/or a moving picture. According to an example embodiment, the camera module 180 may include one or more lenses, an image sensor, an image signal processor, and/or a flash.

According to an example embodiment, the power management module 188 managing power supplied to the electronic device 101 may be formed of as at least a part of, for example, a power management integrated circuit (PMIC).

According to an example embodiment, the battery 189 as a device supplying power to at least one component of the electronic device 101 may include, for example, a non-rechargeable primary battery, a rechargeable secondary battery, and/or a fuel battery.

According to an example embodiment, the communication module 190 may establish a wired or wireless communication channel between the electronic device 101 and the external electronic device (for example, the electronic device 102, the electronic device 104, and/or the server 108) and may support performing of communications through the established communication channel. The communication module 190 may include one or more communication processors independently operated from the processor 120 (for example, the application processor) and supporting a wired communication or a wireless communication. According to an example embodiment, the communication module 190 may include a wireless communication module 192 (for example, a cellular communication module, a short-range wireless communication module, and/or a global navigation satellite system (GNSS) communication module) and/or a wired communication module 194 (for example, a local area network (LAN) communication module and/or a power line communication module) and may communicate with an external electronic device through a short-range communication network such as a first network 198 (for example, Bluetooth, WiFi direct, or infrared data association (IrDA)) and/or a second network 199 (for example, a cellular network, the Internet, and/or a computer network (for example, a LAN or WAN)) by using a corresponding communication module. The above-described various kinds of the communication module 190 may be implemented by one chip or separate chips.

According to an example embodiment, the wireless communication module 192 may identify and authenticate the electronic device 101 in a communication network by using user information stored in the subscriber identification module 196.

According to an example embodiment, the antenna module 197 may include one or more antennas transmitting and/or receiving a signal or power to or from the outside. According to an example embodiment, the communication module 190 (for example, the wireless communication module 192) may transmit and/or receive a signal to or from the external electronic device through an antenna suitable for a communication method.

Some of the above components may be connected to one another through a communication method among peripheral devices (for example, a bus, a general purpose input/output (GPIO), a serial peripheral interface (SPI), and/or a mobile industry processor interface (MIPI)) and may exchange a signal (for example, an instruction or data) with one another.

According to an example embodiment, the instruction or data may be transmitted and/or received between the electronic device 101 and the external electronic device 104 through the server 108 connected to the second network 199. The electronic devices 102 and 104 may be the same kind of devices as the electronic device 101 or different kinds of devices from the electronic device 101. According to an example embodiment, all or parts of operations executed by the electronic device 101 may be executed by another external electronic device or a plurality of external electronic devices. According to an example embodiment, when the electronic device 101 automatically performs a certain function or service or performs a certain function or service based on a request, instead of or in addition to executing the function or service, the electronic device 101 may request at least a partial function related thereto from an external electronic device.

The external electronic device that receives the request may execute the requested function and/or an additional function and may transmit the result to the electronic device 101. The electronic device 101 may process the received result as it is or may additionally process the received result and may provide the requested function or service. For this purpose, for example, a cloud computing technology, a dispersion computing technology, and/or a client-server computing technology may be used.

While the inventive concepts have been particularly shown and described with reference to example embodiments thereof, it will be understood that various changes in form and details may be made therein without departing from the spirit and scope of the following claims.

What is claimed is:

1. A speech processing apparatus comprising:
   a plurality of microphones configured to receive a plurality of input signals; and
   processing circuitry configured to, generate a spatial filtering signal corresponding to the plurality of input signals through spatial filtering, generate estimated noise information by integrating a first noise information generated based on a presence probability (PP) of a speech signal included in the plurality of input signals with a second noise information generated based on coherence information among the plurality of input signals, and generate an estimated speech signal by filtering the spatial filtering signal based on the estimated noise information.

2. The speech processing apparatus of claim 1, wherein the processing circuitry is configured to:

generate the estimation noise information by linearly combining the first noise information with the second noise information by using the coherence information representing whether the input signals have directionality as a weight.

3. The speech processing apparatus of claim 1, wherein the processing circuitry is configured to:

generate a gain to which the estimated noise information is reflected by using a wiener filter; and generate the estimated speech signal by multiplying the generated gain by the spatial filtering signal.

4. The speech processing apparatus of claim 1, wherein the processing circuitry is configured to:

generate directional noise information for a current frame by linearly combining directional noise information for a previous frame with the spatial filtering signal by using the PP of the speech signal as a weight.

5. The speech processing apparatus of claim 1, wherein the processing circuitry is configured to:

generate intermediate noise information based on power spectrum density (PSD) among the plurality of input signals and the coherence information; and generate diffuse noise information for a current frame by linearly combining the intermediate noise information with the spatial filtering signal by using the PP of the speech signal as a weight.

6. The speech processing apparatus of claim 5, wherein the processing circuitry is configured to:

generate the PSD of the plurality of input signals;

generate the coherence information among the plurality of input signals by using the PSD;

generate a posteriori signal to noise ratio (SNR) by using the spatial filtering signal and the diffuse noise information on a previous frame; and generate the diffuse noise information on the current frame by using the PSD, the coherence information, the posteriori SNR, and the PP of the speech signal.

7. The speech processing apparatus of claim 6, wherein the processing circuitry is configured to:

generate the coherence information by using noise signal coherence for the previous frame as noise signal coherence for the current frame in response to the PP of the speech signal being greater than a first threshold value; and generate the noise signal coherence for the current frame by linearly combining the noise signal coherence for the previous frame with input signal coherence in response to the PP of the speech signal being equal to or less than the first threshold value.

8. The speech processing apparatus of claim 7, wherein the processing circuitry is configured to:

generate the coherence information by using the noise signal coherence for the previous frame as the noise signal coherence for the current frame in response to the PP of the speech signal being less than a second threshold value;

generate intermediate noise information by removing the noise signal coherence for the current frame from the input signal coherence; and generate speech signal coherence for the current frame by linearly combining the intermediate noise information with speech signal coherence for the previous frame in response to the PP of the speech signal being equal to or greater than the second threshold value.

9. A method of estimating a noise signal in a plurality of input signals, the method comprising:

generating directional noise information based on a spatial filtering signal generated by performing spatial filtering on the plurality of input signals and presence probability (PP) of a speech signal included in the plurality of input signals;

generating diffuse noise information based on coherence information among the plurality of input signals; and estimating the noise signal by linearly combining the directional noise information with the diffuse noise information by using the coherence information as a weight.

10. The method of claim 9, wherein the generating the directional noise information comprises:

generating directional noise information on a current frame by linearly combining directional noise information on a previous frame with the spatial filtering signal by using the PP of the speech signal as a weight.

11. The method of claim 9, wherein the generating the diffuse noise information comprises:

generating intermediate noise information based on power spectrum density (PSD) and the coherence information among the plurality of input signals by using the PP of the speech signal as the weight; and generating the diffuse noise information by linearly combining the intermediate noise information with the spatial filtering signal by using the PP of the speech signal as the weight.

12. The method of claim 11, wherein the generating the diffuse noise information comprises:

generating PSD for the plurality of input signals;

generating the coherence information among the plurality of input signals by using the PSD;

generating a posteriori SNR by using the spatial filtering signal and the diffuse noise information for a previous frame; and generating diffuse noise information on a current frame by using the PSD, the coherence information, the posteriori SNR, and the PP of the speech signal.

13. The method of claim 12, wherein the generating the coherence information comprises:

generating input signal coherence by using the PSD;

comparing the PP of the speech signal with a first threshold value; and using one of first noise coherence that is noise signal coherence for the previous frame or second noise coherence obtained by linearly combining noise signal coherence for the previous frame with the input signal coherence as noise signal coherence for the current frame in accordance with a comparison result.

14. The method of claim 13, wherein the generating the coherence information comprises:

comparing the PP of the speech signal with a second threshold value; and using one of first speech coherence that is speech signal coherence for the previous frame or second speech coherence obtained by linearly combining intermediate noise information obtained by removing noise signal coherence for the current frame from the input signal coherence with speech coherence information for the previous frame as speech signal coherence for the current frame.

15. An electronic device comprising:
an input device configured to receive a plurality of input signals including a speech signal and a noise signal; and
processing circuitry electrically connected to the input device and configured to,
estimate the speech signal from the plurality of input signals,
generate a spatial filtering signal through spatial filtering for the plurality of input signals,
generate directional noise information based on presence probability (PP) of the speech signal included in the plurality of input signals and the spatial filtering signal,
generate diffuse noise information based on coherence information among the plurality of input signals, and
estimate the noise signal included in the plurality of input signals by linearly combining the directional noise information with the diffuse noise information.

16. The electronic device of claim 15, wherein the processing circuitry is configured to:
linearly combine the directional noise information with the diffuse noise information by using the coherence information as a weight.

17. The electronic device of claim 15, wherein the processing circuitry is configured to:
use noise signal coherence for a previous frame as noise signal coherence for a current frame in response to the PP of the speech signal being greater than a first threshold value; and
generate the noise signal coherence for the current frame by linearly combining the noise signal coherence for the previous frame with input signal coherence in response to the PP of the speech signal being equal to or less than the first threshold value.

18. The electronic device of claim 16, wherein the processing circuitry is configured to:
use speech signal coherence for a previous frame as speech signal coherence for a current frame in response to the PP of the speech signal being less than a second threshold value; and
generate intermediate noise information by removing noise signal coherence for the current frame from input signal coherence and generate the speech signal coherence for the current frame by linearly combining the intermediate noise information with the speech signal coherence for the previous frame in response to the PP of the speech signal being equal to or greater than the second threshold value.

19. The electronic device of claim 15, wherein the processing circuitry is configured to:
estimate the speech signal included in the plurality of input signals by filtering the spatial filtering signal based on the estimated noise signal.

* * * * *